(12) United States Patent
Asaoka et al.

(10) Patent No.: US 8,192,193 B2
(45) Date of Patent: Jun. 5, 2012

(54) MOLDING MATERIAL FEED SCREW USED IN A MOLDING MATERIAL SUPPLY DEVICE OF AN INJECTION MOLDING MACHINE

(75) Inventors: Hiroyasu Asaoka, Yamanashi (JP);
Junpei Maruyama, Yamanashi (JP);
Wataru Shiraishi, Yamanashi (JP);
Toshio Ishikuro, Yamanashi (JP); Akira Oomori, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 13/153,481

(22) Filed: Jun. 6, 2011

(65) Prior Publication Data
US 2012/0040038 A1    Feb. 16, 2012

(30) Foreign Application Priority Data
Aug. 12, 2010  (JP) .................................. 2010-180744

(51) Int. Cl.
B29C 45/60   (2006.01)
(52) U.S. Cl. ........................... 425/208; 425/550
(58) Field of Classification Search .............. 425/208, 425/542, 550
See application file for complete search history.

(56) References Cited

U.S. PATENT DOCUMENTS

| | | | | |
|---|---|---|---|---|
| 4,640,672 A | * | 2/1987 | Ellwood | 425/208 |
| 4,996,919 A | * | 3/1991 | Mansfield | 425/208 |
| 2003/0104093 A1 | * | 6/2003 | Wurtele | 425/208 |
| 2005/0003034 A1 | * | 1/2005 | Watanabe et al. | 425/208 |
| 2005/0084559 A1 | * | 4/2005 | Blach | 425/208 |
| 2007/0141188 A1 | * | 6/2007 | Kim | 425/208 |

FOREIGN PATENT DOCUMENTS

JP         62-37693 Y2    9/1987

* cited by examiner

*Primary Examiner* — Timothy Heitbrink
(74) *Attorney, Agent, or Firm* — Lowe Hauptman Ham & Berner LLP

(57) ABSTRACT

A notched region in which the outer periphery of a screw flight is cut out is provided in a molding material feed screw. A wedge-shaped portion is formed by both a front wall surface of the screw flight and a wall surface of the boundary where the outer periphery of the screw flight is cut out. As a result of rotation of the molding material feed screw, since the wedge-shaped portion advances while pushing aside resin pellets located in the front thereof in two lateral directions of the front wall surface of the screw flight and the wall surface of the boundary where the outer diameter of the screw flight is cut out, entrapment of the resin pellets between the edge of a material supply port of a molding material supply device and the outer periphery of the screw flight is avoided as much as possible.

4 Claims, 5 Drawing Sheets

MOLDING MATERIAL FEED SCREW USED IN A MOLDING MATERIAL SUPPLY DEVICE OF AN INJECTION MOLDING MACHINE

RELATED APPLICATIONS

The present application is based on, and claims priority from, Japanese Application Number 2010-180744, filed Aug. 12, 2010, the disclosure of which is hereby incorporated by reference herein in its entirety.

BACKGROUND OF THE INVENTION

1. Field of the Invention

The present invention relates to a molding material feed screw used in a molding material supply device of an injection molding machine.

2. Description of the Related Art

A molding material supply device is arranged between a material supply port and a hopper or hopper loader of an injection molding machine in order to supply material to the injection molding machine. During molding by an injection molding machine, a molding material from the hopper or hopper loader, and mainly a resin in the form of pellets, is supplied to the injection molding machine via a molding material supply device while being suitably cut into desired portions.

The relationship between the molding material supply device and the injection molding machine body is explained using FIG. 8.

In FIG. 8, a molding material supply port 23 of a molding material supply device 20 is connected to a hopper 22, and a material supply port 14 of an injection molding machine body 10 is connected to a material discharge port 25 of the molding material supply device 20. A molding material feed screw 24 driven by a driving device such as a motor 21 is rotatably arranged within the molding material supply device 20. This molding material feed screw 24 has spiral grooves formed therein by providing a screw flight 40.

The injection molding machine body 10 is provided with a heating cylinder 11 housing a plasticizing screw 15 for filling molten resin into a metal mold clamped by a clamping device (not shown). The heating cylinder 11 is installed with a heater 13 around the outer periphery thereof for heating the resin supplied to the heating cylinder 11 by the molding material, supply device 20.

Resin pellets 30 (see FIG. 9) used as molding material supplied from the hopper 22 to the molding material supply port 23 of the molding material supply device 20 are transported to the material discharge port 25 through grooves of the molding material feed screw 24 by rotation of the molding material feed screw 24 driven by the motor 21, transferred to the material supply port 14 of the injection molding machine body 10, and used for molding. The resin pellets can be suitably apportioned into amounts required for molding according to the amount of rotation of the molding material, feed screw 24 of the molding material supply device 20.

Normally, the molding material supply port 23 of the molding material supply device 20 is filled with the resin pellets 30, and the resin pellets 30 are fed inside the molding material supply device 20 while being pushed by the spiral screw flight 40 provided on the molding material feed screw 24 due to rotation of the molding material feed screw 24. In order to ensure stable transport of the resin pellets 30, the gap between the outer periphery of the screw flight 40 provided on the molding material feed screw 24 and the cylindrical inner wall 28 of a cylindrical space 27 of the molding material supply device 20 is preferably as small as possible.

However, if the outer diameter of the screw flight 40 approaches the inner diameter of the cylindrical space 27 in order to reduce the size of the gap between the outer periphery of the screw flight 40 and the cylindrical inner wall 28 of the molding material supply device 20, a phenomenon occurs in which the resin pellets 30 become entrapped between the edge (material supply port edge 26) of the molding material supply port 23 of the molding material supply device 20 and the outer edge of the screw flight 40 during rotation of the molding material feed screw 24.

FIG. 9 depicts a resin pellet 31 entrapped between the material supply port edge 26 and the outer periphery of the screw flight 40. Furthermore, the material supply port edge 26 serves as the connection between the molding material supply port 23 and the cylindrical space 27 (see FIG. 8).

If the resin pellets 30 become entrapped between the material supply port edge 26 and the outer edge of the screw flight 40, a considerable load acts on the rotating operation of the molding material feed screw 24, and a large force (torque) is required to drive and rotate the molding material feed screw 24. In addition, crushing of the entrapped pellet 31 or scraping along the cylindrical inner wall 28 by the entrapped pellet 31 can cause defective molding. Moreover, a considerable load may act continuously on rotation of the molding material feed screw 24 as a result of the entrapped pellet 31 being pushed into the gap between the cylindrical inner wall 28 and the outer periphery of the screw flight 40.

In order to avoid this entrapment of the resin pellets 30, entrapment of resin pellets was conventionally suppressed by forming a notch in the outer periphery of the screw flight 40 in a region of the molding material feed screw 24 of the molding material supply device 20 where entrapment occurs.

For example, Examined Japanese Utility Model Publication No. 62-37693 discloses a technology of a raw material processing device installed with a screw feeder in which a gap with the inner diameter of a raw material supply unit was partially increased in size by cutting out a portion of a screw flight near the front edge of a raw material supply port.

FIG. 10 is an explanatory drawing of the related art in which a notch is provided in the outer periphery of the screw flight 40 in the molding material supply device 20.

As shown in FIG. 10, the outer diameter of the screw flight of a region of the screw flight 40 where entrapment of the resin pellets 30 occurs is made to be somewhat smaller than the outer diameter of the screw flight 40 at other portions. In other words, the outer diameter of a notched portion 43 of the screw flight 40 is smaller than the outer diameter of a non-notched portion 42. In addition, a boundary 41 of the notch where the outer periphery of the screw flight 40 has been cut out is parallel to an axis of rotation 59 of the molding material feed screw 24. As a result of increasing the size of the gap between the screw flight 40 and the cylindrical inner wall 28 of the region where entrapment occurs as shown in FIG. 10, entrapment of the resin pellet 30 can be reduced.

However, when a notch and large gap are provided in a portion of the screw flight 40, the force that feeds the resin pellets 30 in the forward direction of the molding material supply device 20 ends up decreasing. In particular, since the portion of the level difference formed in the boundary 41 of the notch of the portion where the notch is provided in the screw flight 40 is formed parallel to the feed screw axis of rotation 59, a phenomenon occurs in which the resin pellets 30 continue to rotate together with the molding material feed screw 24 as a result of being pushed into that portion containing the level difference.

If the resin pellets 30 continue to rotate together with rotation of the molding material feed screw 24, since the resin pellets 30 wear down and become thin due to friction of the resin pellets 30 or the resin pellets 30 soften due to heat of friction, the resin pellets 30 end up becoming entrapped in the gap between the outer periphery of the screw flight 40 and the inner wall of the cylindrical space 27 of the molding material supply device 20. As a result, a large load is imparted to rotation of the molding material feed screw 24 or the formation of foreign objects occurs during molding.

SUMMARY OF THE INVENTION

Therefore, an object of the present invention is to provide a molding material feed screw used in a material supply device of an injection molding machine capable of suppressing the occurrence of entrapment caused by rotation of resin pellets together with rotation of the molding material feed screw at a boundary where a notch has been cut out of a screw flight, by forming a notched region in the outer periphery of the screw flight provided in the molding material feed screw used in a molding material supply device to provide a large gap between the outer periphery of the screw flight, and an inner all of a cylindrical space of the material supply device.

The molding material feed screw according to the present invention is used in a molding material supply device of an injection molding machine, and a molding material is supplied from a first molding material supply port on the molding material supply device side to a second molding material supply port on the injection molding machine side. A sharp-angled, wedge-shaped portion is formed in the outer periphery of the screw flight of the molding material feed screw in the vicinity of the location of the front end of the edge of the first molding material supply port, and the outer periphery of the screw flight has a notched region along a prescribed length in the opposite direction to the direction in which the molding material is supplied to the second molding material supply port from the wedge-shaped portion.

The outer periphery of the screw flight can be formed in the shape of a step so that the outer diameter of the screw flight in the notched region is smaller towards the front and larger towards the rear when viewed in the direction in which the molding material is supplied to the second molding material supply port.

The outer periphery of the screw flight can be formed into a tapered shape so that the outer diameter of the screw flight in the notched region is smaller towards the front and larger towards the rear when viewed in the direction in which the molding material is supplied to the second molding material supply port.

A wall surface of the boundary of the notched region where the outer periphery of the screw flight is cut out that forms one side of the wedge-shaped portion can be provided at a location within a 0.25 pitch in a forward direction from, as well as within a 0.25 pitch in a backward direction from, the location of the front end of the first, molding material supply port when viewed in the direction in which the molding material is supplied to the second molding material supply port.

According to the present invention, by forming a notched region in the outer periphery of a screw flight provided on a molding material feed screw used in a molding material, supply device, a large gap can be provided between the outer periphery of the screw flight and an inner wall of a cylindrical space of the resin supply device, and a molding material feed screw used in a material supply device of an injection molding machine can be provided that is capable of suppressing the occurrence of entrapment caused by rotation of resin pellets together with rotation of the molding material feed screw at a boundary where the notch is cut out of the screw flight.

BRIEF DESCRIPTION OF THE DRAWINGS

The previously described and other objects and features of the present invention will be made clear from the following examples with reference to the accompanying drawings, wherein.

DETAILED DESCRIPTION OF THE PREFERRED EMBODIMENTS

First, an explanation is provided of a molding material feed screw according to a first embodiment of the present invention using FIGS. 1 to 5.

Figure 1:
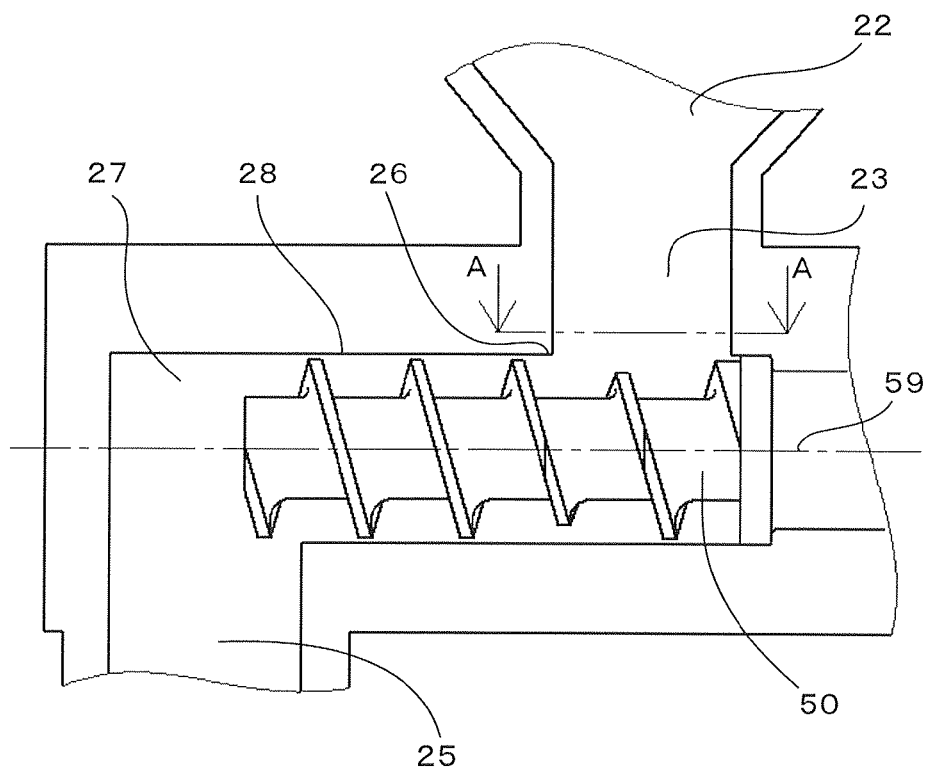
FIG. 1 is an explanatory drawing of an essential portion of a molding material feed screw used in a molding material supply device according to the present invention.
Figure 8:
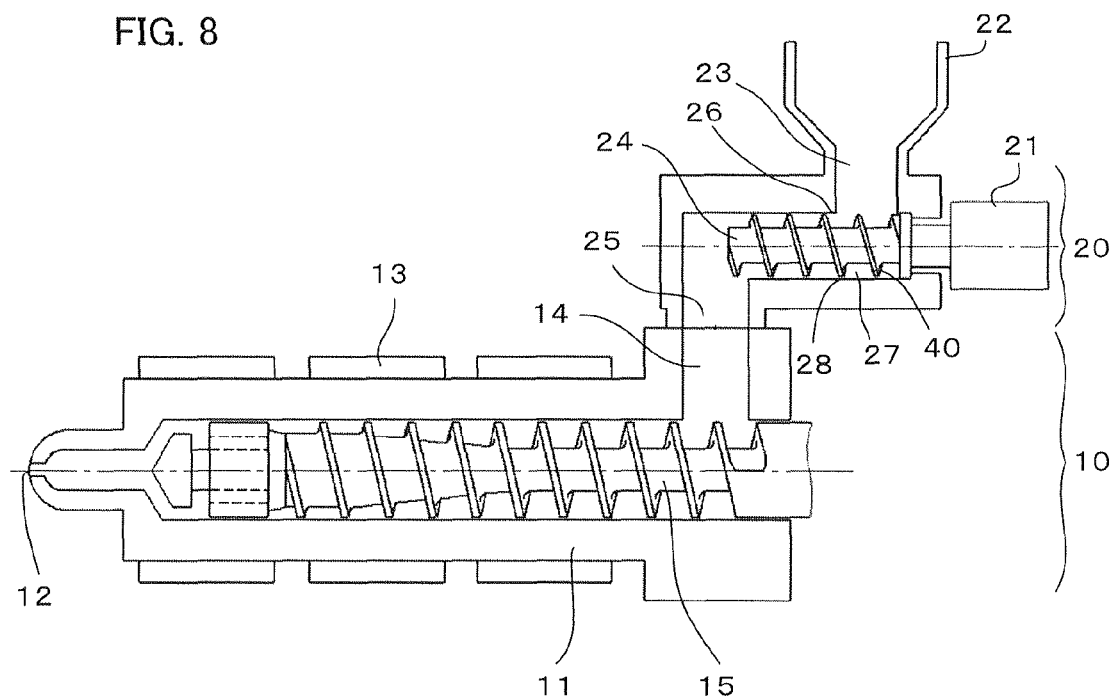
FIG. 8 is an explanatory drawing of the relationship between a molding material supply device and an injection molding machine body.
Figure 9:
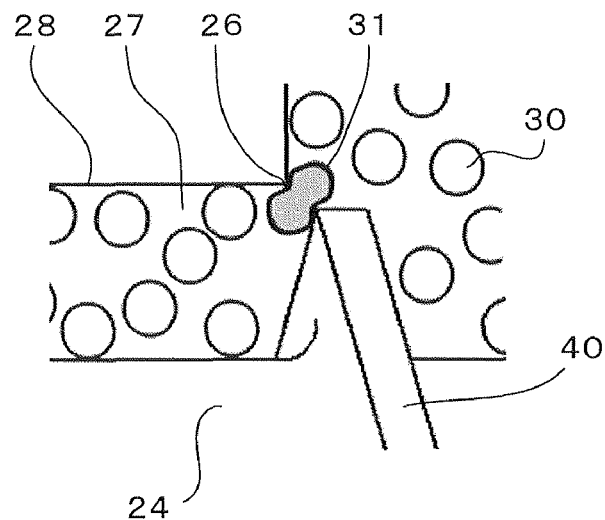
FIG. 9 is an explanatory drawing depicting a resin pellet entrapped between a material supply port edge and the outer periphery of a screw flight.

FIG. 1 is an enlarged view of the portion of the molding material supply device 20 in FIG. 8 showing the relationship between a molding material supply device and an injection molding machine body. However, a molding material feed screw 50 shown in FIG. 1 differs from the molding material feed screw (molding material feed screw according to the related art) shown in FIG. 8.

Figure 3:
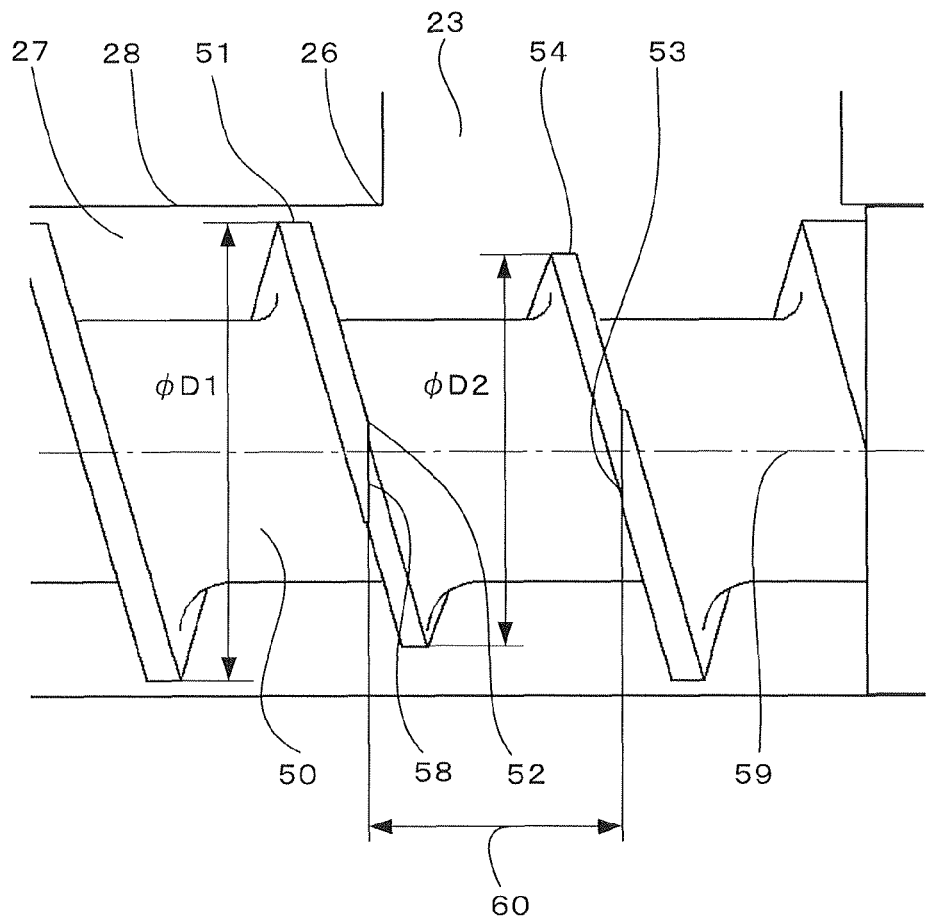
FIG. 3 is an explanatory drawing of a first embodiment of a molding material feed screw according to the present invention.

In the molding material feed screw 50 shown in FIG. 1, a portion of a screw flight 51 thereof at which entrapment of the resin pellets 30 occurs is cut out and has an outer diameter ϕD2 that is smaller than that of other portions (outer diameter ϕD1) ϕD1>ϕD2) as shown in FIG. 3. By making a portion of the screw flight 51 of the molding material feed screw 50 to be a notched screw flight 54 as shown in FIG. 3, entrapment of the resin pellets 30 (see FIG. 5) can be suppressed.

Figure 2:
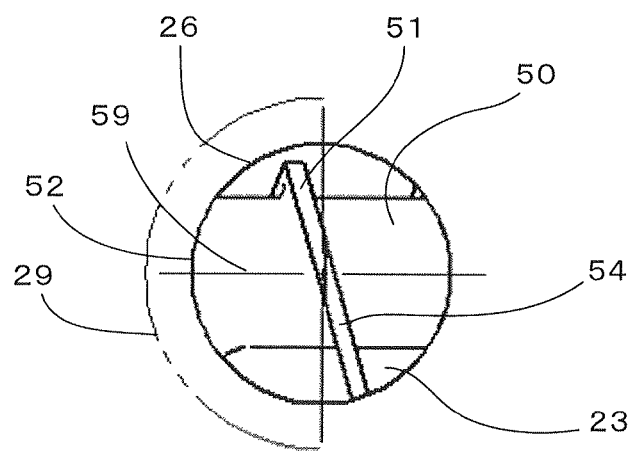
FIG. 2 is an overhead view of a cross-section taken along line of FIG. 1.

The molding material supply port 23 of the molding material supply device 20 has a circular cross-section in the example shown in FIGS. 1 and 2. In the case the molding material supply port 23 has a circular cross-section as shown in FIG. 2, entrapment of the resin pellets 30 occurs easily at a region on the side indicated with a dashed-two dotted line 29 shown in FIG. 2. Consequently, a portion where the outer periphery of the screw flight 51 is cut out preferably covers the region on the side of the dashed-two dotted line 29.

In addition, since the resin pellets 30 are transferred to the front of the molding material feed screw 50 by being pushed by the screw flight 51 of the molding material feed screw 50, it is not appropriate to cut out the screw flight 51 to the degree that it is completely removed. The screw flight 51 is formed so that the screw flight, outer diameter φD2 of a notched region 60 where the outer periphery of the screw flight 51 has been cut out is made so as to have a larger outer diameter than the root diameter of the molding material feed screw 50, and so that the resin pellets 30 are able to be transferred forward even in the notched region.

Since the region where entrapment of the resin pellets 30 occurs easily is determined according to the shape of the molding material supply port 23, such as that of a round hole, oblong hole or square hole and the like, and the arrangement of the molding material supply port 23, the notched region 60 cut out from the outer periphery of the screw flight 51 of the molding material feed screw 50 is determined according to the shape and arrangement of the molding material supply port 23 of the molding material supply device 20 used.

Figure 4:
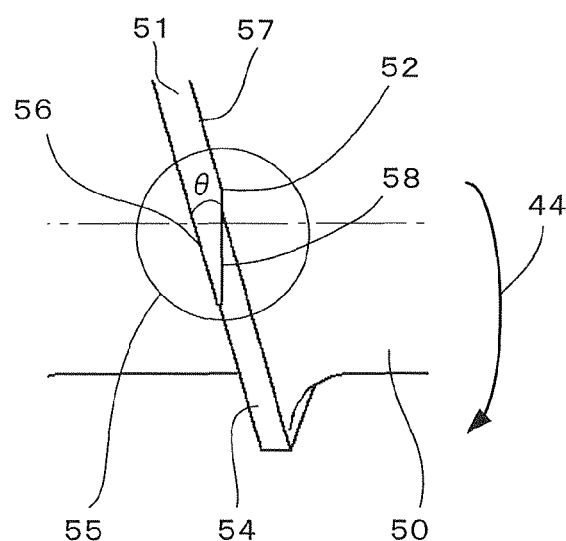
FIG. 4 is an enlarged view of a leading end in a portion of a screw flight shown in FIG. 3 where the outer diameter of the screw flight is smaller than other portions.

Moreover, in the molding material, feed screw 50 shown in FIG. 3, a wedge-shaped portion is formed at a starting point 52 of the notch in the forward direction of the notched region 60 of the screw flight 51 where entrapment of the resin pellets 30 occurs most easily as shown in FIG. 4.

In the molding material feed screw 50 shown in FIG. 3, at the starting point 52 of the notch in the forward direction of the notched region 60 of the screw flight 51 where entrapment of the resin pellets 30 occurs most easily, the wedge-shaped portion provided at the starting point 52 of the notch in the forward direction (see FIG. 4) advances while pushing aside the resin pellets 30 (see FIG. 4) that are in front in the direction of rotation of the wedge-shaped portion of the starting point 52 of the notch in the forward direction due to rotation in the direction of feed screw rotation 44 of the molding material feed screw 50. Furthermore, reference numeral 53 denotes a starting point of the notch in the backward direction.

A wedge-shaped portion, in which an angle θ formed by a boundary wall surface 58 where the outer periphery of the screw flight 51 is cut out and a screw flight front wall surface 56 is a sharp angle, is formed as shown in FIG. 4 in the notched region 60 at which the outer diameter of the outer periphery of the screw flight 51 is φD2 at the starting point 52 of the notch in the forward direction (on the side of the material discharge port 25, see FIG. 8). Furthermore, in FIG. 4, reference numeral 57 denotes a screw flight rear wall surface, while reference numeral 44 denotes the direction of rotation of the molding material feed screw 50. Furthermore, the leading end of the wedge-shaped portion is not required to have a sharp edge in the manner of a blade.

Figure 5:
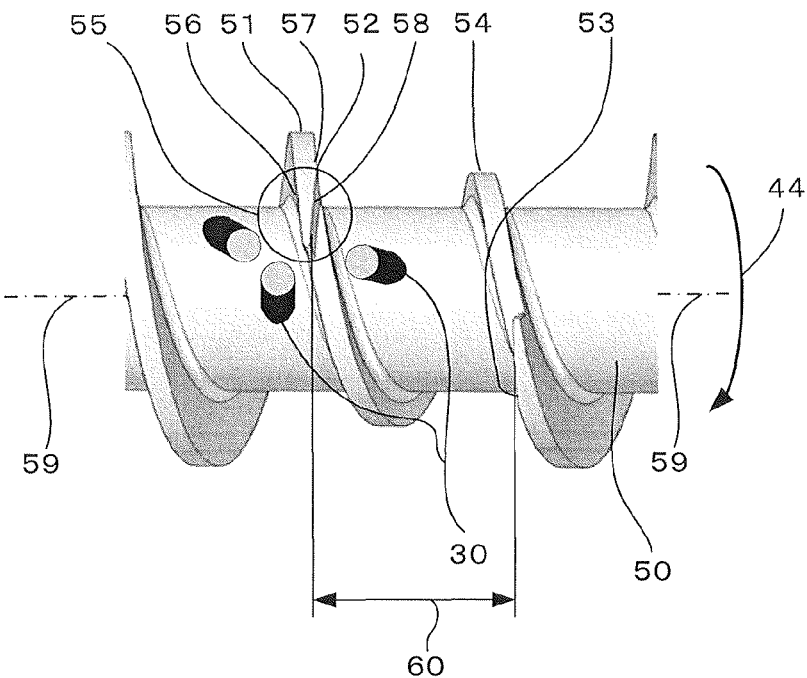
FIG. 5 is a three-dimensional drawing of the molding material feed screw shown in FIG. 3.

FIG. 5 is a three-dimensional view of the molding material feed screw 50 in a first embodiment of the present invention shown in FIGS. 3 and 4

The notched region 60, where the outer periphery of the screw flight 51 is cut out, is provided in the molding material feed screw 50. A wedge-shaped portion, which is formed by the screw flight front wall surface 56 and the boundary wall surface 58 where the periphery of the screw flight is cut out, is able to advance while pushing aside the resin pellets 30 in front of the wedge-shaped portion in the two lateral directions of the screw flight front wall surface 56 and the boundary wall surface 58 where the outer diameter of the screw flight is cut out due to rotation of the molding material feed screw 50 in the direction of feed screw rotation 44.

Figure 10:
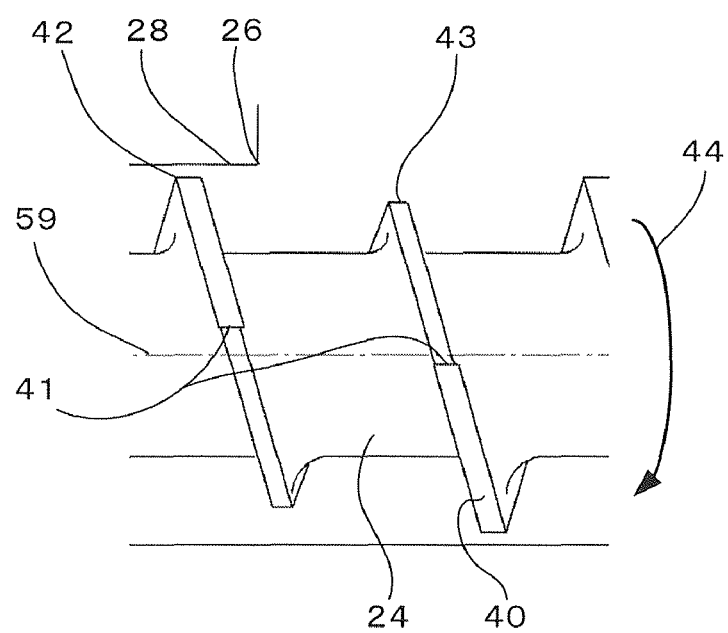
FIG. 10 is an explanatory drawing of the related art in which a notch is provided in the outer periphery of a screw flight of a molding material feed screw.

As a result of the wedge-shaped portion pushing aside the resin pellets 30, the resin pellets 30 are forcibly separated into both directions of the screw flight front wall surface 56 and the screw flight back wall surface 57 of the screw flight 51. As a result, the resin pellets 30 are pushed onto a level difference in the surface of the notch boundary (see notch boundary 41 in FIG. 10), making it difficult for the phenomenon that occurred in the related art, in which the resin pellets 30 continue to rotate together with rotation of the molding material feed screw 51, to occur, and as a result thereof, entrapment of the resin pellets 30 between the edge of the material supply port of the molding material supply device and the outer edge of the screw flight can be reduced.

In addition, although the probability of entrapment of the resin pellets 30 decreases the smaller the outer diameter φD2 of the screw flight in the notched region 60 where the outer periphery of the screw flight 51 is cut out as previously described, decreasing the outer diameter of the screw flight weakens the force by which the resin pellets 30 are transferred in the forward direction of the molding material feed screw 50.

Figure 6:
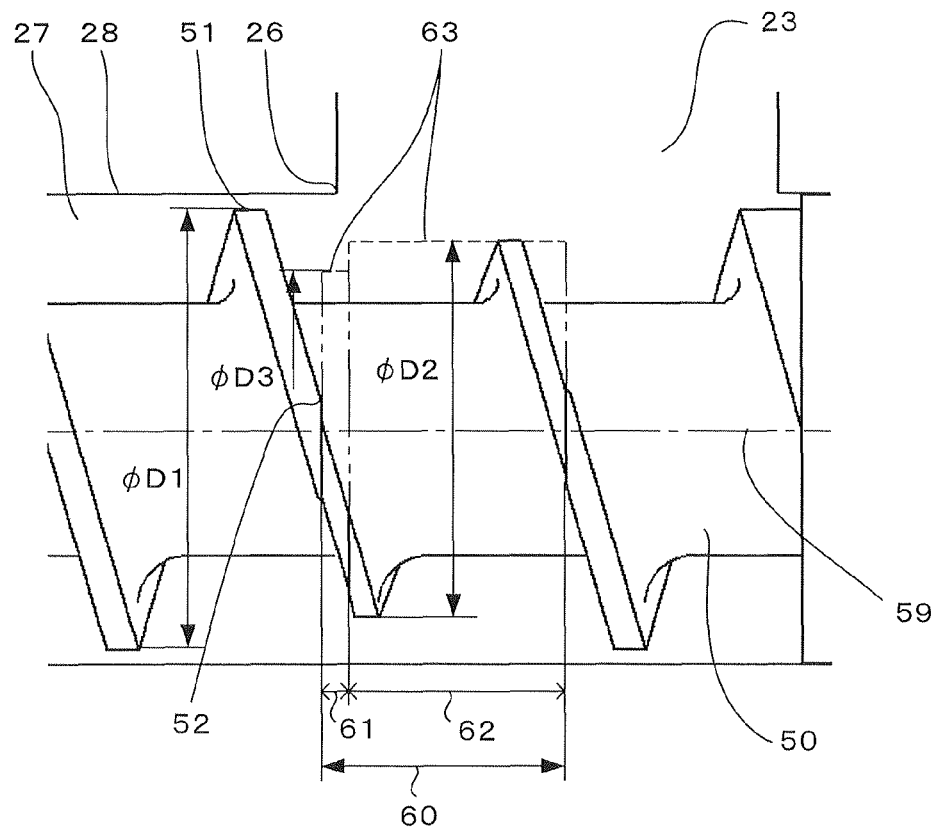
FIG. 6 is an explanatory drawing of a second embodiment of a molding material feed screw according to the present invention.
Figure 7:
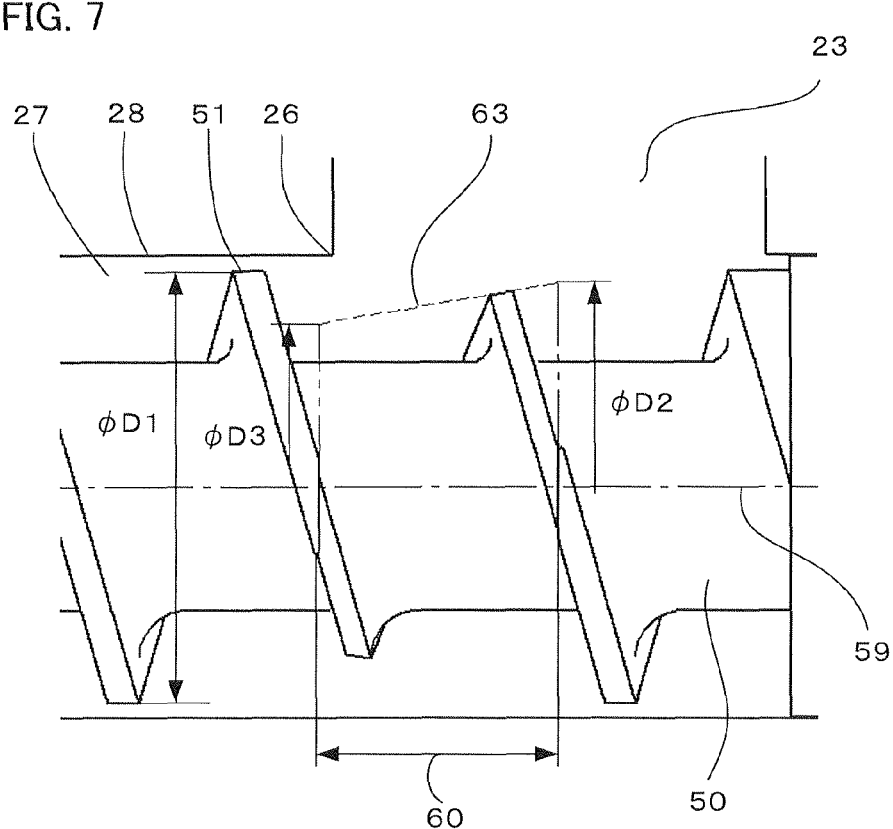
FIG. 7 is an explanatory drawing of a third embodiment of a molding material feed screw according to the present invention.

Therefore, the result of intentionally making the notch larger in front of the molding material supply port 23 where the resin pellets 30 are easily entrapped than in the first embodiment is a second embodiment shown in FIG. 6 and a third embodiment shown in FIG. 7. Reference numeral 63 denotes a ridge line of the outer periphery of a screw flight of the notched region 60 where the screw flight 51 is cut out.

In the second embodiment shown in FIG. 6, within the region 50 where the outer periphery of the screw flight 51 is cut out, the screw flight in a region 61 that is a portion thereof in the forward direction is formed into the shape of a step in which an outer diameter φD3 thereof is smaller than the outer diameter φD2 of the screw flight of a region 62 of the remaining portion (φD1>φD2>φD3).

In addition, in the third embodiment shown in FIG. 7, the screw flight of the notched region 60 where the periphery of the screw flight is cut out is formed into a tapered shape in which the outer diameter φD3 to the front is small, while the outer diameter φD2 to the rear is large (φD1>φD2>φD3).

As is shown in FIGS. 6 and 7, the outer diameter of the screw flight can be prevented from being made smaller than required by cutting out the outer periphery of the screw flight 51 in a stepwise manner. Consequently, since a loss of force that transfers the resin pellets 30 to the front of the molding material feed screw 50 can minimized and the outer diameter of the screw flight 51 in front of the molding material supply port 23 where entrapment of the resin pellets 30 occurs more easily can be selectively decreased, the occurrence of entrapment of the resin pellets 30 can be effectively suppressed. In addition, as a result of decreasing the outer diameter of the screw flight in front of the direction of rotation of the previously described wedge-shaped portion (see FIG. 4), movement of the resin pellets 30, which are pushed aside when the wedge-shaped portion advances due to rotation in the direction of feed screw rotation 44 of the molding material feed screw 50, is facilitated, thereby enhancing the effect of pushing aside the resin pellets 30 by the wedge-shaped portion.

The shape of the outer periphery of the screw flight 51 in the notched region 60 where the outer periphery of the screw flight is cut out shown in FIGS. 6 and 7 is selected according to the shape of the molding material supply port 23 and the arrangement of the molding material supply port 23. In the case of the shape of the molding material supply port 23 being such that the edge of the molding material supply port 23 where entrapment of the resin pellets 30 occurs is in the shape of a narrow square hole, a notch in the shape of a step as shown in FIG. 6 can be said to be suitable. On the other hand, in the case the molding material supply port 23 has the shape of a round hole or oblong hole having a smooth, continuous edge, a notch having a tapered shape as shown in FIG. 7 can be said to be suitable.

Moreover, although not indicated in the description or drawings, the outer periphery of the screw flight 51 in the notched region 60 where the outer periphery of the screw flight is cut out may be of a shape that combines the step-like shape explained with reference to FIG. 6 and the tapered shape explained with reference to FIG. 7. In addition, in any of the cases of the first embodiment (FIGS. 1 to 5), the second embodiment (FIG. 6) and the third embodiment (FIG. 7), values for the screw flight outer diameter φD2 and the screw flight outer diameter φD3 may be determined in consideration of the size and entrapment reduction efficiency of the resin pellets 30 presumed to be used.

Moreover, although occurrence of entrapment of the resin pellets 30 between the edge of the material supply port of the molding material supply device and the outer periphery of the screw flight can be maximally suppressed by aligning the location where the above-mentioned wedge-shaped portion is provided on the screw flight 51, namely the starting point 52 of the notch in the forward direction of the notched region 60 where the outer diameter of the screw flight 51 is cut out (see FIG. 3), with the front end of the molding material supply port 23, it may also be slightly to the front or back of the location of the front end of the molding material supply port 23. In consideration of the size of typical resin pellets 30, if the starting point 52 of the notch in the forward direction of the noted region 60 where the outer diameter of the screw flight 51 is cut out is made to be within a pitch of about 0.25 from the location of the front end of the molding material supply port 23 based on the pitch, of the molding material feed screw 50, the effect of reducing entrapment of the resin pellets 30 between the edge of a material supply port of a molding material supply device and the outer edge of a screw flight can be expected to be adequately demonstrated.

Furthermore, the "location of the front end of the molding material supply port 23" refers to the location where the front end of the molding material supply port 23 intersects a central axis of rotation 59 of the molding material feed screw 50 when the end surface of the molding material supply port 23 is projected towards the central axis of rotation 59. In other words, it is the location of the end in front of the edge of the molding material supply port. In addition, a "pitch of about 0.25 from the location of the front end of the molding material supply port 23" refers to a location advanced by a pitch of about 0.25 in the direction of the central axis of rotation 59 based on the intersected location thereof (based on a pitch of 1 for the gap between the screw flight 51 and screw flight 51 adjacent thereto on the central axis of rotation 59).

In the present invention, entrapment of the resin pellets 30 between the edge of a material supply port of the molding material supply device 20 and the outer periphery of a screw flight can be reduced in comparison with the related art by modifying the shape of the screw flight 51 in the notched region 60 where the outer periphery of the screw flight 51 is cut out of the molding material feed screw 50 of the molding material supply device 20.

What is claimed is:

1. A molding material feed screw used in a molding material supply device of an injection molding machine, wherein
    a molding material is supplied from a first molding material supply port on the molding material supply device side to a second molding material supply port on the injection molding machine side, and
    the molding material feed screw is formed with a sharp-angled, wedge-shaped portion formed in the outer periphery of the screw flight and in the vicinity of the location of the front end of the edge of the first molding material supply port, and
    the outer periphery of the screw flight has a notched region along a prescribed length in the opposite direction to the direction in which the molding material is supplied to the second molding material supply port from the wedge-shaped portion.

2. The molding material feed screw according to claim 1, wherein the outer periphery of the screw flight is formed in the shape of a step so that the outer diameter of the screw flight in the notched region is smaller towards the front and larger towards the rear when viewed in the direction in which the molding material is supplied to the second molding material supply port.

3. The molding material feed screw according to claim 1, wherein the outer periphery of the screw flight is formed into a tapered shape so that the outer diameter of the screw flight in the notched region is smaller towards the front and larger towards the rear when viewed in the direction in which the molding material is supplied to the second molding material supply port.

4. The molding material feed screw according to claim 1, wherein a wall surface of the boundary of the notched region where the outer periphery of the screw flight is cut out that forms one side of the wedge-shaped portion is provided at a location within a 0.25 pitch in a forward direction from, as well as within a 0.25 pitch in a backward direction from, the location of the front end of the first molding material supply port when viewed in the direction in which the molding material is supplied to the second molding material supply port.

* * * * *